(12) United States Patent
Wimberger-Friedl et al.

(10) Patent No.: US 9,044,752 B2
(45) Date of Patent: Jun. 2, 2015

(54) MICROFLUIDIC CARTRIDGE WITH PARALLEL PNEUMATIC INTERFACE PLATE

(75) Inventors: Reinhold Wimberger-Friedl, AE Eindhoven (NL); Roel Penterman, AE Eindhoven (NL); Hendrik Halling Van Amerongen, AE Eindhoven (NL); Johannes Theodorus Antonius Loring, AE Eindhoven (NL); Jochem Martijn Van Uden, AE Eindhoven (NL)

(73) Assignee: Biocartis NV, Mechelen (BE)

( * ) Notice: Subject to any disclaimer, the term of this patent is extended or adjusted under 35 U.S.C. 154(b) by 466 days.

(21) Appl. No.: 13/503,322

(22) PCT Filed: Oct. 6, 2010

(86) PCT No.: PCT/IB2010/054520
§ 371 (c)(1), (2), (4) Date: Jul. 16, 2012

(87) PCT Pub. No.: WO2011/048521
PCT Pub. Date: Apr. 28, 2011

(65) Prior Publication Data
US 2012/0266986 A1    Oct. 25, 2012

(30) Foreign Application Priority Data

Oct. 21, 2009 (EP) .................................... 09173589

(51) Int. Cl.
*B01L 3/00* (2006.01)
*F04B 43/06* (2006.01)
(Continued)

(52) U.S. Cl.
CPC ........... *B01L 3/502738* (2013.01); *F04B 43/06* (2013.01); *B01L 3/502715* (2013.01);
(Continued)

(58) Field of Classification Search
CPC ............................... F04B 19/006; F04B 43/06
USPC .................................................. 417/395, 360
See application file for complete search history.

(56) References Cited

U.S. PATENT DOCUMENTS 4,119,120 A * 10/1978 Mehaffy et al. ............... 137/885
5,593,290 A    1/1997 Greisch
(Continued)

FOREIGN PATENT DOCUMENTS

DE     102006030068 A    1/2008
WO     2010073020 A1    7/2010

OTHER PUBLICATIONS

International Search Report in corresponding International Application No. PCT/IB2010/054520 dated Jan. 24, 2011.

*Primary Examiner* — Charles Freay
(74) *Attorney, Agent, or Firm* — Kusner & Jaffe

(57) ABSTRACT

A microfluidic cartridge for placement onto a parallel pneumatic interface plate of a pneumatic instrument is provided. The cartridge includes a three dimensional fluid channel, in which a fluid is to be transported, a flexible membrane that spans a plane and is part of an outer surface of the cartridge. The three dimensional fluid channel is spatially defined in three dimensions by internal walls of the cartridge and by the flexible membrane. The flexible membrane is in a ground state, when no pressure or vacuum is applied to the flexible membrane. However, the flexible membrane is pneumatically deflectable from the ground state perpendicular to the plane of the flexible membrane in two directions when the cartridge is placed onto the parallel pneumatic interface plate.

13 Claims, 6 Drawing Sheets

(51) Int. Cl.
*F04B 19/00* (2006.01)
*F04B 43/04* (2006.01)
*F16K 99/00* (2006.01)

(52) U.S. Cl.
CPC ..... *B01L3/50273* (2013.01); *B01L 2300/0809* (2013.01); *B01L 2300/0874* (2013.01); *B01L 2300/123* (2013.01); *B01L 2300/1805* (2013.01); *B01L 2400/0481* (2013.01); *B01L 2400/0487* (2013.01); *B01L 2400/0638* (2013.01); *F04B 19/006* (2013.01); *F04B 43/043* (2013.01); *F16K 99/0001* (2013.01); *F16K 99/0015* (2013.01); *F16K 99/0059* (2013.01); *F16K 2099/0084* (2013.01)

(56) References Cited

U.S. PATENT DOCUMENTS

| | | | |
|---|---|---|---|
| 5,863,801 A | 1/1999 | Southgate | |
| 6,948,918 B2 * | 9/2005 | Hansen | 417/395 |
| 7,832,429 B2 * | 11/2010 | Young et al. | 137/829 |
| 2003/0008308 A1 | 1/2003 | Enzelberger | |
| 2007/0053796 A1 | 3/2007 | Gau Jen, Jr. | |
| 2007/0166199 A1 | 7/2007 | Zhou | |
| 2008/0063543 A1 * | 3/2008 | Xu et al. | 417/395 |

* cited by examiner

MICROFLUIDIC CARTRIDGE WITH PARALLEL PNEUMATIC INTERFACE PLATE

FIELD OF THE INVENTION

The invention relates to fluid actuation in microfluidic cartridges. The invention especially relates to a microfluidic cartridge for being inserted in a parallel pneumatic interface plate of a pneumatic instrument, an interface plate for interfacing with a microfluidic cartridge and between a pneumatic instrument, a system for fluid actuation inside a micro fluidic cartridge comprising such a cartridge and such an interface plate and relates to a pneumatic instrument.

BACKGROUND OF THE INVENTION

Biosensors are used for the detection of molecules in biological samples, for instance proteins or DNA for diagnostic applications. It is also desired to detect drugs, therapeutic or abuse, in blood, urine or saliva. Such tests are developed to be used in many different settings and surroundings, e.g. at the point of care for medical applications, or at any desired place for drugs of abuse, e.g. at the roadside. In all cases a robust, reliable and sensitive device is required, which must also be low cost since it needs to be disposed after the measurement.

Carrying out such a biochemical assay requires a certain degree of fluid handling, at least the sample fluid must be introduced in the sensing device in order to allow binding of the target molecules to the sensor surface. Depending on the kind of assay more or less complicated microfluidic systems are designed. Since the sample is contaminating it must not get in contact with the instrument and must be stored safely inside the cartridge during and after the measurement.

Recently fully integrated micro fluidic on chip biochemical systems or lab on a chip systems have been developed. An issue in these micro fluidic systems is the manipulation of the fluids from and to the different reaction chambers, for which micro actuators such as pumps and valves are needed. Pumping and valving can be done in numerous ways. Depending on the application, for example type of assay, performance requirements, and cost requirements, the actuation of the fluid for dissolution of reagents, incubation, binding and washing, as an example, is implemented in different ways. There is a trade-off between the degree of control and simplicity, wherein simplicity can be identified with low costs. Either the fluid is actuated directly by mechanical metering with pistons or the fluid is not actuated but driven by capillary forces, so-called passive driving.

The latter is a cost-effective solution but does not allow for flow reversal, the flow rate is limited and not constant with distance and most importantly depending on the viscosity and surface tension of the fluid. A change in the required flow characteristics needs to be implemented in 'hardware' on the disposable which makes the system less flexible. Mechanical driving on the other hand is very flexible but requires physical contact which creates problems with operational lifetime of the instrument and contamination i.e. cleaning problems.

Therefore there may be a need for an alternative low-cost fluid actuation technology in microfluidic systems in particular for medical disposables, like biosensors.

SUMMARY OF THE INVENTION

It may be an object of the invention to provide for an improved fluid actuation in microfluidic cartridges.

The described embodiments similarly pertain to the microfluidic cartridge, the pneumatic interface plate, the system comprising a microfluidic cartridge and a pneumatic interface plate and to the pneumatic instrument. Synergetic effects may arise from different combinations of the embodiments although they might not be described in detail.

According to a first embodiment of the present invention, a microfluidic cartridge for being placed onto a parallel pneumatic interface plate of a pneumatic instrument is provided. The cartridge comprises a three-dimensional fluid channel in which a fluid is to be transported by pneumatic pumping of a pneumatic instrument. Furthermore the microfluidic cartridge comprises a flexible membrane, wherein the flexible membrane span a plane and wherein the flexible membrane builds an outer surface of the cartridge.

Additionally the three dimensional fluid channel is spatially defined in three dimensions by internal walls of the cartridge and by the flexible membrane, wherein the flexible membrane is in a ground state when no pressure or vacuum is applied to the flexible membrane. The flexible membrane is pneumatically deflectable from the ground state perpendicular to the plane of the flexible membrane in two directions when the cartridge is placed onto the parallel pneumatic interface plate.

In other words the fluid is not transported over a flat surface but is moved along the three dimensional liquid channel.

Furthermore the flexible membrane may be pneumatically deflectable in the areas which are part of the outer surface of the cartridge. In other words in a first region the flexible membrane spans the fluid channel which first region is part of the outer surface of the cartridge. According to this exemplary embodiment the flexible membrane may additionally extend in a second region under the outer surface of the cartridge, so that the membrane is not accessible from outside the cartridge in that second region.

Furthermore the "ground state of the flexible membrane" describes the situation in which neither pressure nor vacuum is applied to the flexible membrane. Starting from this situation, the flexible membrane is deflectable towards the inner part of the cartridge and is also deflectable away from the cartridge. This may for example be seen in FIG. 1 in which an upwards and a downwards deflection of the flexible membrane at different positions along the membrane leads to a desired liquid transportation. In other words the flexible membrane is deflectable in two directions namely towards the fluid channel and away from the fluid channel. Nevertheless this does not exclude, that the flexible membrane may be prestressed or predeflected.

The cartridge, which may in this and in any other embodiment be for example a disposable cartridge, allows pneumatic actuation that is carried out through a reversible pneumatic interconnection between the pneumatic instrument and the cartridge, which interconnection is formed by the flexible membrane. Pneumatic drivers are integrated in the instrument for a low cost and reliable solution of the cartridge. The actuation of the fluid that is contained in the fluid channel within the cartridge is achieved by the deflection of the flexible membrane which may be attached to the major surface of the cartridge. Thus when the cartridge is attached to or inserted in the pneumatic interface plate compartments are formed by the flexible membrane of the cartridge and parts of the pneumatic interface plate. The pressure in these compartments, which pressure may be generated by the separate pneumatic instrument, determines the deflection of the flexible membrane which in turn actuates the fluid through which a movement is caused.

This microfluidic cartridge takes advantage of the high power and large stroke of pneumatic actuation while at the same time keeping the cartridge simple and at low costs and allowing easy introduction of other physical transport across the interface plate like heat or acoustic vibration.

Furthermore a large number of actuators may be integrated easily into the flat pneumatic interface plate as no individual fixation, like tubing, is required for the pneumatic actuation.

In other words, as pneumatic tubing elements and pressure or vacuum generating elements are not present at the micro fluidic cartridge and are not present at the corresponding interconnecting interface plate a large number of actuators can be integrated easily in the interface plate. In other words, a planar microfluidic cartridge is provided which may in connection with a planar pneumatic interface plate allow a convenient and reliable pneumatic driving of fluids in the cartridge without the need of tubing within the cartridge. Furthermore this may easily be extendible to a large number of pneumatic elements as well as the integration of thermal, acoustic or other interface plates in the same plane may be simplified.

The term pneumatic elements in this and every other embodiment of the invention describes positions at which the flexible membrane is actuated pneumatically, i.e. valves and pumps, or more generally interaction areas. It is also the flexibility of changing positions and being able to have position in close proximity which is an advantage of the present invention.

It may be seen as an essential characteristic of the provided microfluidic cartridge to realize the actuating of fluids in the cartridge by a pneumatic instrument. The facts, that the pneumatic driving makes use of a flexible cartridge membrane and that the pneumatic chambers underneath the membrane are reversibly assembled are important. This means, that the separation plane between the cartridge and the pneumatic instrument crosses the pneumatic chambers.

In other words when the cartridge is removed the pneumatic supply channels, pneumatic channels and pneumatic chambers are open. The chambers underneath the actuated membrane are formed by the combination of the cartridge and the interface plate on the instrument. When the cartridge is lifted up the pressure may not be transferred anymore to the membrane, in contrast to tubing, which is not used for the actuation of the membrane according to the present invention and which tubing is fixed mechanically.

The microfluidic cartridge may be used in combination with a pneumatic instrument, that contains supply channels for the pneumatic driving and that contains a substantially flat interface plate towards the microfluidic cartridge that contains the fluid channels. The fluid channels are confined by a flexible layer which may be actuated once the cartridge is put on the instrument. By moving the flexible membrane up and down a volume is displaced inside the cartridge and the membrane can close channels to provide for a valve function within fluid channel.

The stroke of the membrane deflection is based on the height between the position of the membrane when touching the pneumatic interface plate of the pneumatic instrument as may be seen for example in the following FIG. 1 and/or the position when touching the substrate chamber on top of the membrane in the cartridge (control features).

In other words, the microfluidic cartridge comprises a flexible membrane covering a fluid path. Thereby the flexible membrane covers the total fluid channel system that may contain several fluid paths. It does not have to be the complete outer surface everywhere. But also an embodiment is possible in which the flexible membrane builds the whole outer surface of the cartridge. However, the flexible membrane is always attached to the cartridge. After the insertion of the cartridge into a pneumatic instrument, the membrane is locally deflected by pneumatics on the instrument such that the fluid is moved along the fluid path within the cartridge. The membrane is locally sucked away from or pushed towards the cartridge creating a changing volume in the fluid path and under the membrane with which volume change the fluid is transported through the cartridge. Furthermore the cartridge may comprise walls that together with the flexible membrane define a changing volume through which fluid can be transported. Therefore, the invention allows a fluid transportation in the microfluidic cartridge using a relatively simple interface plate between the cartridge and the instrument for processing the cartridge. Instead of interfacing pneumatic tubing, the interface plate between the cartridge and the instrument is formed by a flexible membrane that is deflected by the instrument such that fluid is transported inside cartridge.

As the cartridge is free of pneumatic an electrical elements it may be produced in a cheap and reliable way.

The flexible membrane in combination with an interface plate leads to the possibility to fix the cartridge onto the interface plate only by pneumatic forces.

Therefore no other fixation media like e.g. screws and the like may be needed besides the pneumatic forces generated by the pneumatic instrument. That's why the pneumatic interface plate is called a parallel interface. In other words a deflection of the flexible membrane is created in the closed pneumatic system which comprises the cartridge and the interface plate and the deflection in turn leads to the fixation. The sucking in of the membrane creates the fixation.

According to another exemplary embodiment of the invention, the cartridge has a substantial cuboid shape having six main outer surfaces, wherein the flexible membrane forms one of the main surfaces of the cartridge and wherein the flexible membrane entirely spans the fluid channel.

This exemplary embodiment may for example be seen in FIG. 2*a* as well as for example in FIG. 8.

According to another exemplary embodiment of the invention, the fluid channel and the flexible membrane are arranged to each other in such a way, that by deflecting the flexible membrane at several points along the flexible membrane by pneumatic pumping of the pneumatic instrument the fluid is transportable from a beginning of the fluid channel to an end of the fluid channel.

Thereby the term "pneumatic pumping" and "pneumatic driving" comprises applying over pressure and/or under pressure to the flexible membrane's surface in order to firstly fix the micro fluidic cartridge onto the interface plate and thus on the pneumatic instrument and secondly to deflect the flexible membrane of the cartridge in such a way, that fluid transportation inside the fluid channel in the cartridge is achieved a desired. In other words, the membrane may be locally sucked away from or pushed towards the inner side of the micro fluidic cartridge which creates a changing volume in the fluid channel and also under the flexible membrane.

By creating such a movement of the flexible membrane by pneumatic pumping the fluid in the cartridge is transported.

According to another exemplary embodiment of the invention, the membrane is deflectable by pneumatic pumping of the pneumatic instrument in such a way, that the membrane closes the fluid channel to provide for a valve function.

In other words, by combining the microfluidic cartridge with a pneumatic interface plate and a pneumatic instrument over pressure and/or under pressure may be applied to the membrane in such a way, that the fluid path is closed by the deflected membrane. In other words, the fluid path may be spatially divided into different sections wherein a first section may contain fluid and a second section may be free of fluid. These sections may be spatially separatable by providing this valve function.

In case the valve function is performed in such a way that the membrane closes a pneumatic channel of the interface plate i.e. the membrane is sucked towards the plate, then this is also used to fix the cartridge onto the interface plate as described in more detail below.

According to another exemplary embodiment of the invention, the cartridge is free of pneumatic control elements and free of pneumatic tubing elements.

In other words compared to the state of the invention provides for a beneficial physical separation between the microfluidic cartridge and the instrument, which instrument comprises the pneumatic interface plate with al necessary electrical and pneumatic generation and control elements. The cartridge may be exchanged fast and easy as no screws or fixation media are needed.

According to this exemplary embodiment of the invention the functionality of over pressure, under pressure or vacuum generation and application is totally removed from the cartridge and may be placed for example at an external pneumatic instrument having a pneumatic interface plate. This may lower the costs of the cartridge which is extremely important for a disposable microfluidic cartridge system. Furthermore the liability of the cartridge may be increased, as less technical complexity is present.

According to another exemplary embodiment of the invention, the microfluidic cartridge comprises control features, wherein the control features are adapted for controlling the actuation stroke of the flexible membrane during pneumatic pumping by the pneumatic instrument.

Furthermore, the control features of this and every other embodiment of the invention are also adapted to improve the valve function that is generated when deflecting the flexible membrane.

As can be seen for example in FIGS. 1 and 2 these control features determine at certain points along the fluid channel a certain distance between the flexible membrane and the opposite spatial boundary of the fluid channel. In other words these control features span the fluid channel. By the combination of the cartridge with a pneumatic interface plate as described above, below and for example in FIG. 1 a relief of control features above and below the flexible membrane is provided with which specific desired deflections of the membrane can be caused by applying over pressure or under pressure onto the flexible membrane via pneumatic chambers in the interface plate.

Furthermore it is possible according to another exemplary embodiment of the invention, that rubber frames are only part of the microfluidic cartridge. They may then be placed e.g. onto the microfluidic cartridge. This may e.g. be combined with a flat interface plate.

According to another exemplary embodiment of the invention rubber frames and recesses may both be present at the cartridge and the interface plate.

According to another exemplary embodiment of the invention, a pneumatic interface plate for interfacing with a microfluidic cartridge according to one of the preceding embodiments and between a pneumatic instrument for applying pneumatic pumping at the microfluidic cartridge is provided. The pneumatic interface plate maybe insertable between a microfluidic cartridge according to one of the proceeding embodiments and between a pneumatic instrument for applying pneumatic pumping at the microfluidic cartridge. An insertable interface plate allows the use of different interface plates with a single pneumatic instrument, resulting in greater flexibility when using different interface plates of different designs. The pneumatic interface plate comprises an instrument side, which faces to the instrument when the interface plate is inserted into the instrument. Furthermore the interface plate comprises a cartridge side, which faces to the cartridge when the cartridge is inserted into the interface plate. The interface plate comprises a pneumatic channel to connect a pneumatic fluid of the pneumatic instrument from the instrument side to the cartridge side to enable pneumatic driving of the flexible membrane of the micro fluidic cartridge, wherein the cartridge side has at least one recess for sucking in the flexible membrane of the cartridge.

In other words the cartridge side of the interface plate is adapted for receiving the cartridge in such a way, that a closed pneumatic system is formed that enables firstly the fixation of the cartridge by means of pneumatic forces and secondly allows pneumatic pumping. Thus no screws or other fixation media for connecting the cartridge to the interface plate and thus to connect to the instrument is needed. That's why the pneumatic interface plate is called a parallel interface. Furthermore, the cartridge may be removed just by turning of the under pressure sucking at the cartridge.

Thereby sucking in is to be understood as allowing deflection of the flexible membrane. Furthermore the recess may also be part of the cartridge.

The pneumatic interface plate of this and every other embodiment of the invention may be part of the microfluidic cartridge but may also be part of a pneumatic instrument.

It shall explicitly be noted, that the following and the above described embodiments of the pneumatic interface plate may also be part of the system that comprises a microfluidic cartridge as described above and below and such a pneumatic interface plate.

It shall explicitly be noted, that the pneumatic interface plate may be a substantially single physical element that has to be integrated into a pneumatic instrument. Furthermore it is possible, that the above and below described pneumatic interface plates are a substantial component of such a pneumatic instrument and may completely be integrated into such a pneumatic instrument.

The combination of the pneumatic interface plate and a microfluidic cartridge allows the assembly of pneumatic chambers underneath the membrane as can for example be seen in FIG. 1. In other words, the separation plane between the cartridge which might be a disposable cartridge and the instrument crosses the pneumatic chambers.

These pneumatic chambers may also be utilized to hold the cartridge on the interface plate to assure a good thermal mechanical contact between the interface plate and the cartridge which might be crucial for different functions, like heating or ultrasound actuation of the fluid.

In addition a large number of interaction zones or elements, like pneumatic actuation points or heat transfer areas, or other may be integrated in such a combination of a microfluidic cartridge, and pneumatic instrument and a pneumatic interface plate as they do not require extra footprint as they are placed underneath the actuator in the microfluidic cartridge. Thereby the description of the extra foot print which is avoided according to this exemplary embodiment of the invention is compared a situation where one would have a tube connection somewhere and a separate supply channel towards the position where the pneumatic actuation has to take place. However, according to the present invention the pneumatic connections are merely via the pneumatic channels in the interface plate, so no extra space requirement.

According to another exemplary embodiment of the invention, at least one of the cartridge side and the instrument side of the pneumatic interface plate is substantially flat.

For example, the cartridge side of the pneumatic interface plate is substantially flat, which makes it possible to combine the pneumatic interface plate with a substantially flat and flexible membrane of such a microfluidic cartridge.

According to another exemplary embodiment of the invention, the pneumatic interface plate comprises at least one element chosen from the group comprising heat generating device, heat transfer element made out of aluminum, heat transfer element made out of copper, heat transfer element made out of an alloy of aluminum and/or copper, heat generating device having heat transfer elements that extend to the microfluidic cartridge, acoustic energy generating device, device for treating the fluid with focused or unfocused ultrasound, piezoelectric actuator, mechanical actuator, magnetic actuator and any combination thereof.

In other words, the functionality of the heating of the fluid that is contained within the cartridge is purely integrated in the pneumatic interface plate, which leads to the fact that the microfluidic cartridge can be produced cheap, reliable and easy. Multiple cartridges may be used with only one combination of such a pneumatic interface plate with one pneumatic instrument. A fast exchange of the microfluidic cartridge may be realized through this functionality reduced cartridge.

For example, heating elements may be separated by a thermally insulating material of a steel-based pneumatic interface plate.

According to another exemplary embodiment of the invention, the pneumatic interface plate is made out of a material chosen from the group comprising steel, stainless steel, other chemically resistant and moderately heat conductive materials, and any combination thereof.

Furthermore according to another exemplary embodiment the pneumatic interface plate may also comprise rubber features and/or compressible features around the pneumatic elements to provide a seal between different pneumatic chambers.

According to another exemplary embodiment of the invention, a pneumatic interface plate is provided that comprises control features, wherein the control features are adapted for controlling the actuation stroke of the flexible membrane of the microfluidic cartridge during pneumatic pumping by the pneumatic instrument.

Additionally the control features may be applied to enable a better closing of the valve as the membrane folds around these control features when pressure is applied.

As may be seen for example from FIG. 1 and FIG. 2 control features may have quadratical or rectangular shape and may be used as a spatial delimiter of the deflection of the membrane of the cartridge when pneumatic pumping is applied.

According to another exemplary embodiment of the invention, a system for fluid actuation inside a microfluidic cartridge is provided. The system comprises a microfluidic cartridge according to one of the preceding embodiments and comprises a pneumatic interface plate according to one of the preceding embodiments, wherein the flexible membrane of the cartridge is deflectable by pneumatic pumping through the pneumatic channel of the interface plate in such a way, that a fluid in the fluid channel is movable along the fluid channel.

The system allows the fluid actuation within the cartridge that might for example be disposable. Pneumatic actuation of the fluid is carried out through the flexible membrane which separates the fluid in the cartridge from the pneumatic fluid in the instrument. Pneumatic drivers may be integrated within a pneumatic instrument for a low cost and reliable solution of this system.

It may be seen as an essential characteristic of the provided system that fluids within the cartridge may be actuated or driven i.e. transported by an external pneumatic instrument and that pneumatic driving makes use of the flexible membrane which is part of the cartridge and that the pneumatic chambers, that are formed underneath the flexible membrane within the pneumatic interface plate are reversibly assembled. In other words, the separation plane between the cartridge and the external pneumatic instrument crosses the pneumatic chambers.

According to another exemplary embodiment the cartridge and the pneumatic interface plate are two physically separate components that are reversibly hold together for the fluid actuation only by pneumatic forces.

According to another exemplary embodiment of the invention the flexible membrane and the cartridge side of the interface plate are adapted in combination in such a way that by applying under pressure through a pneumatic channel of the pneumatic interface plate the cartridge is entirely fixed at the interface plate.

Therefore no other fixation media like e.g. screws and the like may be needed besides the pneumatic forces generated by the pneumatic instrument that may also be part of the system. In other words a deflection of the flexible membrane is created in the closed pneumatic system which comprises the cartridge and the interface plate and the deflection in turn leads to the fixation. The sucking in of the membrane creates the fixation.

According to another exemplary embodiment the system comprises a pneumatic instrument for generating pneumatic pumping to the microfluidic cartridge.

Thereby pneumatic pumping comprises generating and applying over and under pressure.

According to another exemplary embodiment of the invention, the cartridge and the interface plate are mechanically connected to each other via the flexible membrane and via the cartridge side of the interface plate.

According to another exemplary embodiment of the invention the fluid transport in the fluid channel is only initiated by the pneumatic pumping through the pneumatic channels.

This exemplary embodiment may be seen from for example FIG. 1 of the following figures. In contrary to a form closure several pneumatic chambers are assembled or are formed when the cartridge and the interface plate are physically connected. These pneumatic chambers that are below the flexible membrane are inside of recesses of the pneumatic interface plate.

In addition these chambers may also be utilized to hold a cartridge on the pneumatic interface plate to assure a good thermal and mechanical contact between the pneumatic interface plate and the cartridge which might be crucial for several functionalities.

According to another exemplary embodiment of the invention, the system comprises control features, wherein the control features are arranged above and below of the flexible membrane, wherein the control features above the flexible membrane are arranged as obstacles for a fluid transport inside the fluid channel of the cartridge. Furthermore, the flexible membrane is mechanically supported by the control features in such a way, that the membrane deflects during pneumatic pumping in such a way, that the obstacles may be passed by the fluid.

In other words, the spatial distribution or the spatial arrangement of the control features along a longitudinal elongation of the flexible membrane leads to the fact, that certain control features are blocking the fluid channel for a movement of the fluid when the membrane is in a relaxed state or pressed against the features by applying over pressure in the pneumatic chamber. By applying corresponding pneumatic pumping which means applying over pressure and/or under pressure at corresponding pneumatic channels within the interface plate this leads to a deflection of the membrane in such a way, that the fluid may be transported along fluid channel without being still blocked by the control feature. In other words, the fluid may be transported around the control features that are in the fluid channel.

According to another exemplary embodiment of the invention, the system comprises pneumatic chambers, wherein between the flexible membrane and the interface plate the pneumatic chambers are assembled reversibly.

In other words, the interconnected surface of the flexible membrane of the cartridge which forms an outer surface of the cartridge in combination with the surface of the cartridge side of the pneumatic interface plate lead to certain recesses below the membrane and within the pneumatic device that may be used for applying over- and/or under pressure onto the membrane by an external pneumatic device that might be connected to the pneumatic interface plate.

According to another exemplary embodiment of the invention, the system comprises an interface plate that comprises a plurality of pneumatic channel to connect the pneumatic fluid of the pneumatic instrument from the instrument side to the cartridge side to enable pneumatic driving of the flexible membrane of the microfluidic cartridge. Thereby the interconnection between the flexible membrane and the interface plate is adapted in such a way, that an alternating pneumatic pumping that comprises applying pressure and applying under pressure leads to a transport of the fluid along the fluid channel.

According to another exemplary embodiment of the invention a pneumatic instrument for generating pneumatic pumping to a microfluidic cartridge for fluid transportation inside the microfluidic cartridge is provided. The pneumatic instrument comprises means for pneumatically actuating a flexible membrane of the microfluidic cartridge, and a pneumatic interface plate according one of the above and below described embodiments. The pneumatic interface plate may be removable from the instrument, leaving an instrument comprising means for pneumatically actuating a flexible membrane of the microfluidic cartridge and suitable for receiving a pneumatic interface plate according to this invention.

It may be seen as the gist of the invention to provide for a combination of a microfluidic cartridge and a pneumatic interface plate in which an outer surface of the microfluidic cartridge, that is formed by a flexible membrane is actuated by a pneumatic interface plate that supplies for over pressure or under pressure that is created by a pneumatic instrument to the membrane. This leads to a corresponding deflection of the membrane which in turn initiates a fluid transport of fluid contained in the cartridge through a fluid channel in the cartridge.

It has to be noted that the embodiments of the invention are described with reference to different subject-matters. In particular, some embodiments are described with reference to cartridge claims whereas other embodiments are described with reference to pneumatic interface plate claims, system claims or instrument claims. However, a person skilled in the art will gather from the above and the following description that unless other notified in addition to any combination or features belonging to one type of subject-matter also any combination between features relating to different subject-matters is considered to be disclosed within this application.

The aspects defined above and further aspects, features and advantages of the present invention can also be derived from the examples of embodiments to be described hereinafter and are explained with reference to examples of embodiments. The invention will be described in more detail hereinafter with reference to examples of the embodiments but to which the invention is not limited

DETAILED DESCRIPTION OF THE EMBODIMENTS

Figure 1:
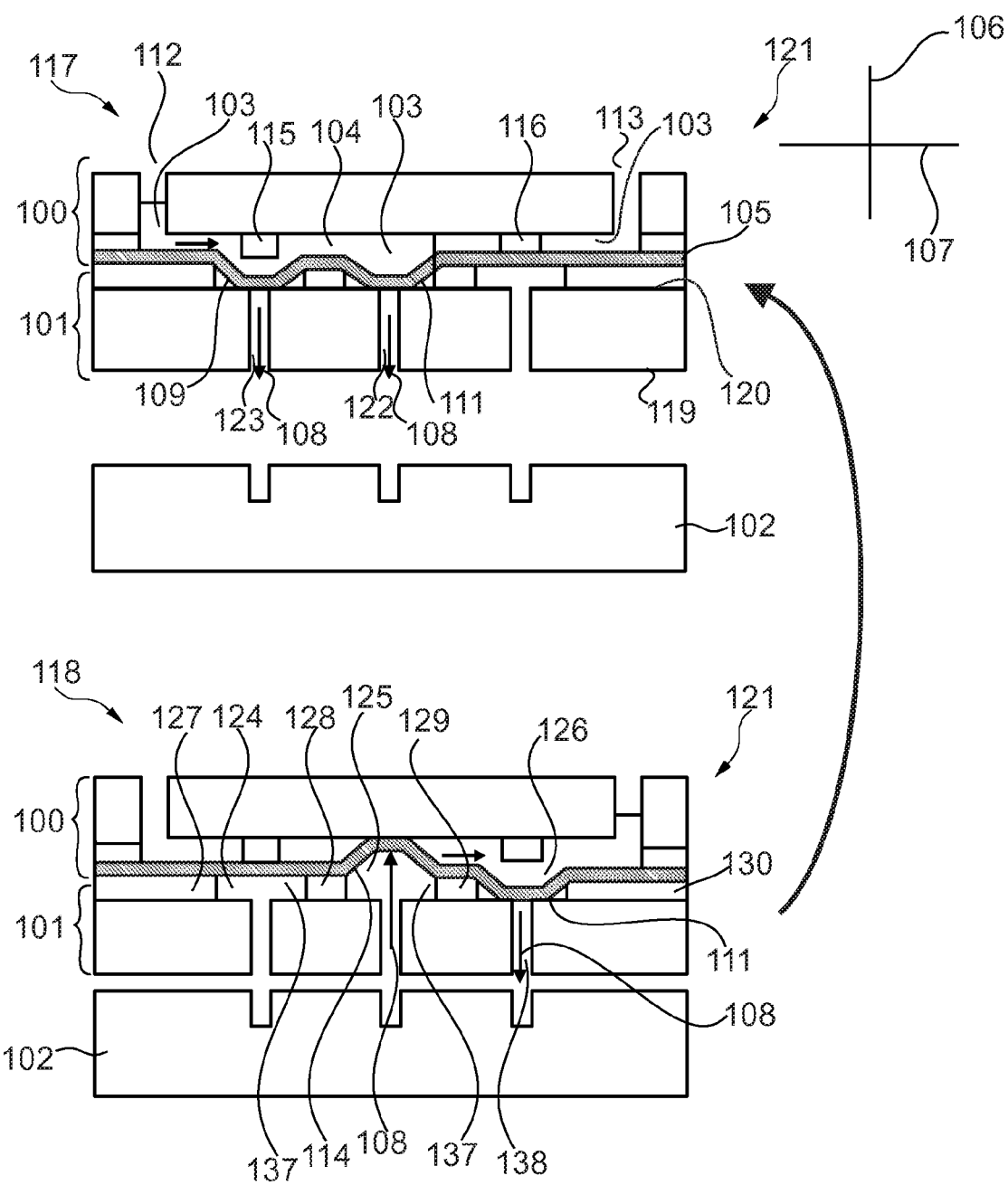
FIG. 1 schematically shows a microfluidic cartridge, a pneumatic interface plate and a pneumatic instrument according to an exemplary embodiment of the invention.

Similar or relating components in the several figures are provided with the same reference numerals. The view in the figure is schematic and not fully scaled.

FIG. 1 shows in the upper part a system 121 for fluid actuation inside a microfluidic cartridge 100 in a first state wherein the lower part of FIG. 1 shows such a system 121 in a second state, in which the contained fluid 104 inside the cartridge has been transported. Both shown systems 121, the upper and the lower one, consist of the same elements.

FIG. 1 shows a microfluidic cartridge 100 for being inserted in the parallel pneumatic interface plate 101 of a pneumatic instrument wherein the cartridge comprises a three-dimensional fluid channel 103 in which a fluid 104 is to be transported. Furthermore the cartridge comprises a flexible membrane 105 wherein the flexible membrane spans a plane. The plane spans along the direction 107. Furthermore the flexible membrane builds an outer surface of the cartridge wherein the fluid channel is spatially defined by walls of the cartridge and by the flexible membrane. Furthermore the flexible membrane is in a relaxed state when no over pressure, under pressure or vacuum is applied to the flexible membrane. The flexible membrane is pneumatically deflectable from the relaxed state perpendicular to the plane of the flexible membrane in two directions. In other words, the membrane 105 can be directed in the direction 106 firstly in the upwards and secondly in the downwards orientation.

Furthermore it can be seen that the flexible membrane is deflected at several points 109, 110, 111 and 114 by pneumatic pumping 108. Thereby pneumatic pumping means that an over pressure and/or an under pressure is applied to the membrane in the pneumatic chambers like e.g. 137. The external pneumatic instrument 102 may create such a pneumatic pumping 108. By applying a corresponding under pressure at the two pneumatic channels 122 and 123 within the pneumatic interface plate 101 the flexible membrane 105 is sucked into the recesses above these pneumatic channels. By changing the pressure situation within the pneumatic channels of the pneumatic interface plate, which is shown at the lower figure of FIG. 1 the flexible membrane is pressed towards the inner side of the cartridge at the middle pneumatic channel of the cartridge. Additionally under pressure is applied at the pneumatic channel 138 on the right hand side so that the fluid is transported from the left-hand side of FIG. 1 to the right-hand side of FIG. 1 inside the fluid channel.

As can be seen from FIG. 1 the interface plate has an instrument side 119 which faces to the instrument when the interface plate is inserted into the instrument 102. Furthermore the interface plate has a cartridge side 120 which faces to the cartridge when the cartridge is inserted into the interface plate. Pneumatic channels 122, 123 and 138 are provided to connect the pneumatic fluid like for example air from the instrument side to the cartridge side to enable pneumatic driving of the flexible membrane of the microfluidic cartridge. The recesses 124 to 126 allow the sucking of the flexible membrane into the recesses. As can be seen in the lower part of FIG. 1 in the middle pneumatic channel 122 the membrane closes the fluid channel to provide for a valve 114 inside the fluid channel.

By applying such a method with sequentially applying over pressure and/or under pressure in a corresponding way the fluid is transportable from the beginning 112 of the fluid channel to the end 113 of the fluid channel within the microfluidic cartridge.

It can be seen that the cartridge side of the interface plate has a step-like surface with recesses and pneumatic channels that are formed in a T-shape like way when looked onto the pneumatic channels and recesses in a cross-section.

In other words, this embodiment provides for a cartridge comprising an external flexible membrane covering a fluid path. After insertion of the cartridge into the instrument, the membrane is locally deflected by pneumatics of the instrument such that the fluid is moved along the fluid path. The membrane is locally sucked away from or pushed towards the cartridge creating a changing volume in the fluid path which is the fluid channel and under the membrane with which fluid is transported through the cartridge. The cartridge may comprise walls that together with the flexible membrane define the changing volume through which the fluid can be transported.

Figure 2:
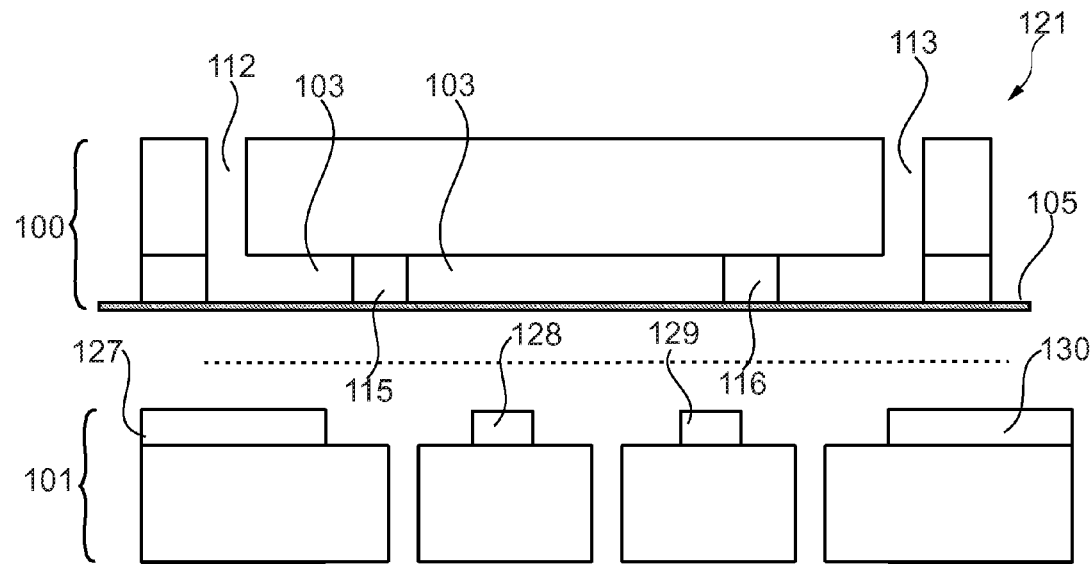
FIG. 2-5 schematically shows a microfluidic cartridge and a pneumatic interface plate according to an exemplary embodiment of the invention.

FIG. 2 shows a system 121 comprising a microfluidic cartridge 100 and a pneumatic interface plate 101. A pneumatic instrument (not shown) may also be comprised.

The interface plate may be substantially flat and may contain features for an improved sealing of the pneumatic chambers and/or may contain features which control the actuation stroke of the flexible membrane of the cartridge. In an alternative embodiment shown in FIG. 3 these stroke control features 127, 128, 129 and 130 as well as 115 and 116 are integrated in the cartridge.

Figure 3:
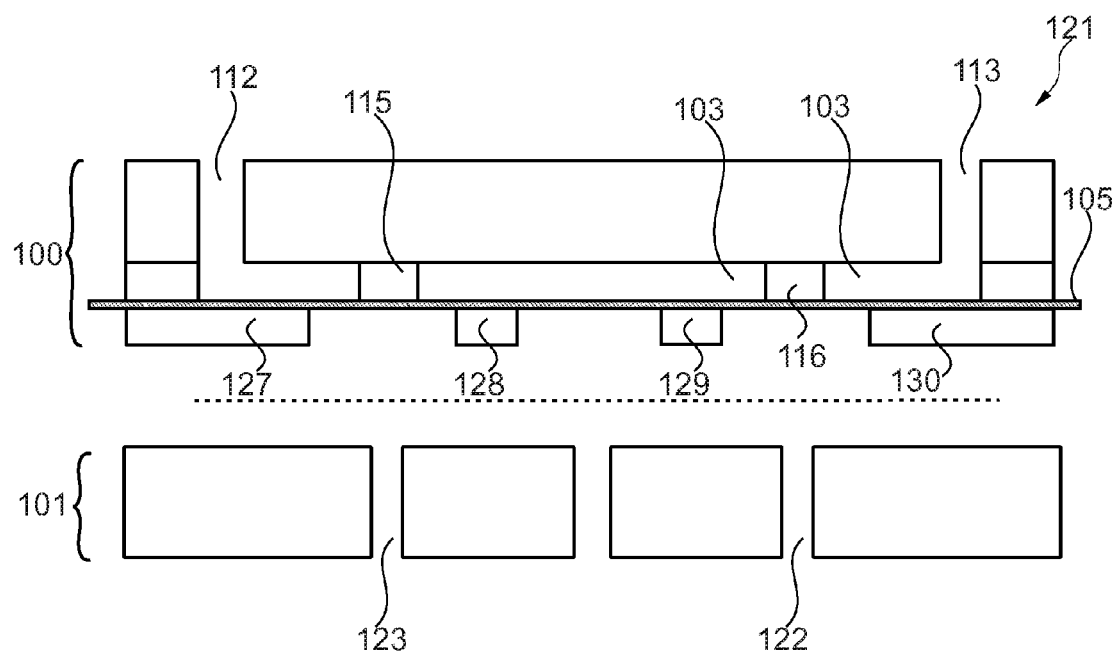

FIG. 3 shows the stroke control feature 127 to 130 on the cartridge side of the pneumatic interface plate 101.

Figure 4:
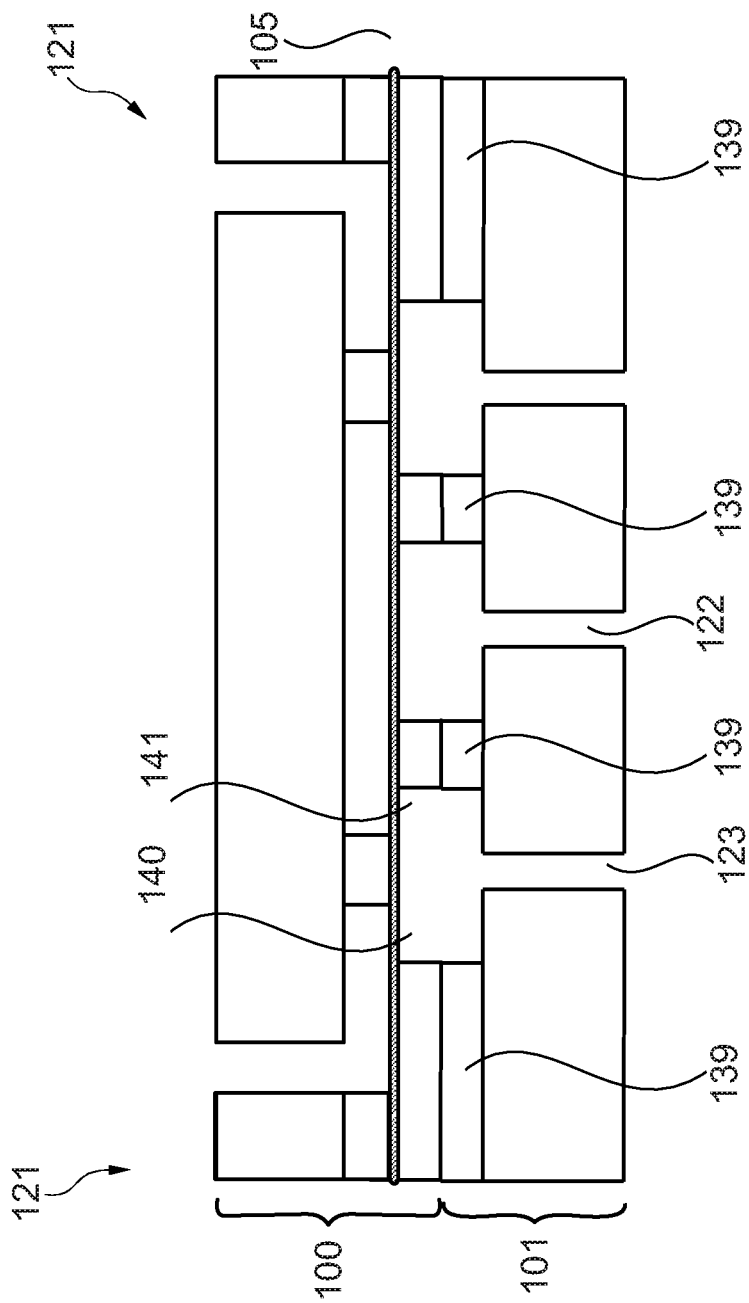

FIG. 4 shows a system 121 with a cartridge 100 and an interface plate 101 in which rubber frames 139 are part of the interface plate and recesses 140, 141 are present partly in the cartridge and partly in the interface plate.

Furthermore it is possible according to another exemplary embodiment of the invention, that rubber frames are only part of the microfluidic cartridge. They may then be placed e.g. onto the microfluidic cartridge. This may e.g. be combined with a flat interface plate.

According to another exemplary embodiment of the invention rubber frames and recesses may both be present at the cartridge and the interface plate.

Figure 5:
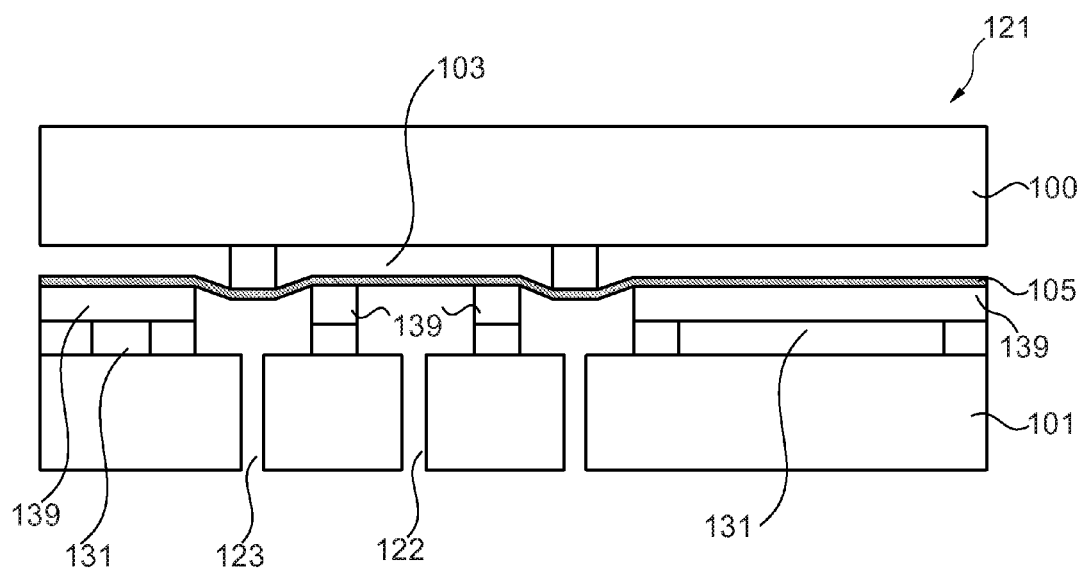

As may be seen from FIG. 5 the interface plate as described above and below may be used to hold the cartridge by applying a vacuum 131 in the areas between the actuators through the instrument interface plate. Furthermore on the cartridge side of 101 rubber frames 139 are applied which may also be seen in FIG. 8 with reference sign 139. These rubber frames allow for a tight seal of the pneumatic chambers. The actuators are attached to the pneumatic channels on the bottom (instrument) side of 100. Thereby actuators are all positions where the membrane is reversibly deflected by the pneumatic system. In areas where one wants to hold the cartridge by vacuum the membrane will not be deflected. It is furthermore possible to apply another layer on the outside (on top of the membrane) to avoid delamination of the membrane by the vacuum forces.

Figure 6:
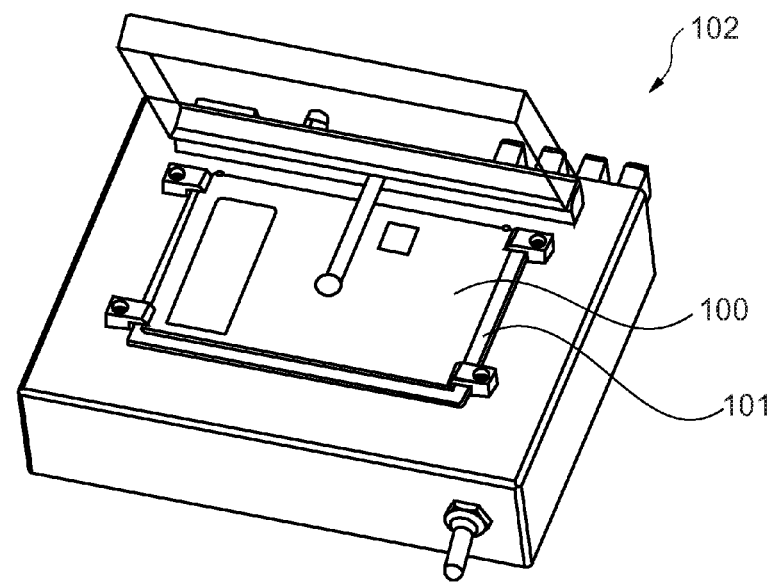
FIG. 6 schematically shows a pneumatic instrument with a microfluidic cartridge and a pneumatic interface plate according to an exemplary embodiment of the invention.

In FIG. 6 a pneumatic instrument 102 is shown which comprises a pneumatic interface plate 101. The instrument may have pneumatic switches and heaters that are integrated inside the shown box. Furthermore pneumatic tubing 1 is comprised within the instrument 102, also pneumatic switches and heaters are integrated within such an instrument.

Figure 7:
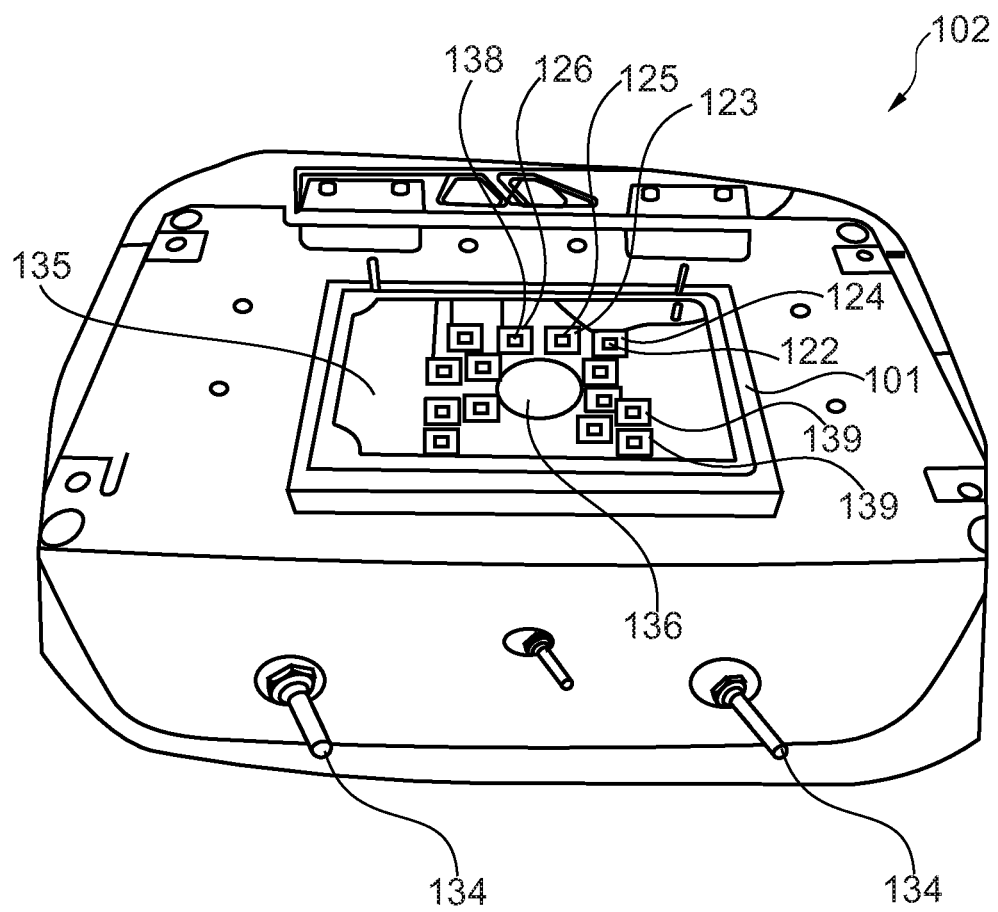
FIG. 7 schematically shows an instrument in which a microfluidic cartridge and a pneumatic interface plate can be integrated according to an exemplary embodiment of the invention.

FIG. 7 shows a system 121 according to another exemplary embodiment of the invention. The system consists of a pneumatic instrument 102 and a pneumatic interface plate 101, which is adapted for receiving a micro fluidic cartridge (not shown here, shown in FIG. 8). Several heaters, 135, 136 are shown inside the interface plate and furthermore pneumatic channels 122, 123 and 138 are shown. Furthermore the recesses 124, 125 and 126 can be seen from FIG. 7. The shown pneumatic interface plate 101 corresponds to the interface plate shown in FIG. 2. The rubber frames 139 that are also shown and described in FIG. 5 can clearly be seen.

Figure 8:
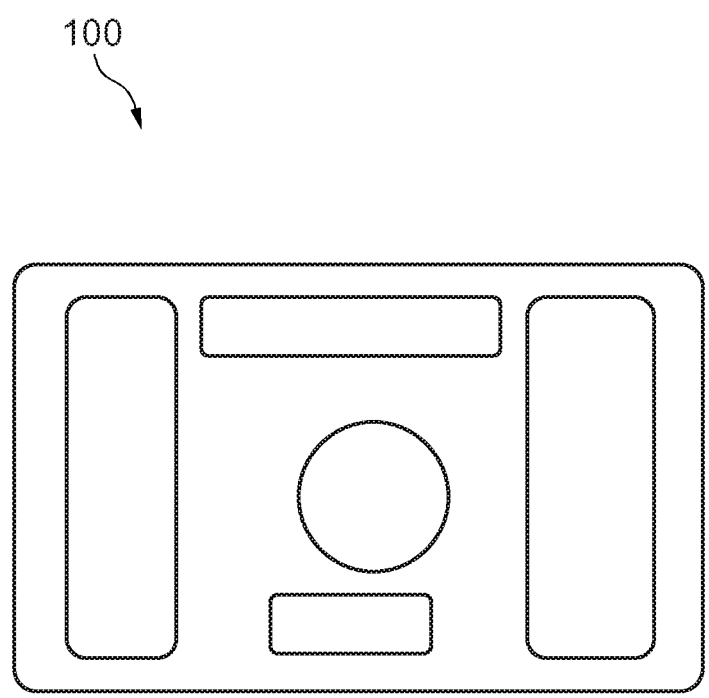
FIG. 8 schematically shows a microfluidic cartridge according to an exemplary embodiment of the invention.

FIG. 8 shows a microfluidic cartridge 100 that may for example be integrated onto the interface plate 101 of FIG. 7 may thus be inserted into the shown instrument 102. This corresponding cartridge of instrument 102 of FIG. 7 has 14 individual addressable valves which can be driven by the instrument shown in FIG. 7. Thereby the term driven refers to pneumatic pumping.

For example, valves may be closed by applying up to 1.5 bar overpressure on the valves which enables reliable sealing of individual compartments. Pumping speeds of more than 1 ml in 10 seconds may be achieved. These are only examples of values. Other pressures, higher or lower and other pumping speeds, higher or lower may also be achieved.

The invention claimed is:

1. A microfluidic cartridge for use with a parallel pneumatic interface plate of a pneumatic instrument, the microfluidic cartridge comprising:
   a three dimensional fluid channel in which a fluid is to be transported, said three-dimensional fluid channel being isolated from the parallel pneumatic interface plate; and
   a flexible membrane that spans a plane, the flexible membrane being part of an outer surface of the microfluidic cartridge that isolates the three-dimensional fluid channel from the parallel pneumatic interface plate, the three dimensional fluid channel being defined in three dimensions by internal walls of the microfluidic cartridge and by the flexible membrane,
   wherein
      the flexible membrane is in an ground state, when no pressure or vacuum is applied to the flexible membrane,
      the flexible membrane is pneumatically deflectable from the ground state perpendicular to the plane in two directions, when the microfluidic cartridge is placed onto the parallel pneumatic interface plate, and the microfluidic cartridge is detachably fixable to the parallel pneumatic interface plate solely by pneumatic forces.

2. The microfluidic cartridge according to claim 1, wherein the fluid channel and the flexible membrane are arranged in such a way that by deflecting the flexible membrane at several points along the flexible membrane by pneumatic pumping of the pneumatic instrument the fluid is transportable from a beginning of the fluid channel to an end of the fluid channel.

3. The microfluidic cartridge according to claim 1, wherein the flexible membrane is deflectable by pneumatic pumping of the pneumatic instrument in such a way that the flexible membrane closes the fluid channel to provide a valve function.

4. The microfluidic cartridge according to claim 1, wherein the microfluidic cartridge is free of pneumatic control elements and free of pneumatic tubing elements.

5. A pneumatic interface plate used in combination with a microfluidic cartridge and a pneumatic instrument, the pneumatic instrument pneumatically fixing the microfluidic cartridge to the pneumatic interface plate and applying pneumatic pumping at the microfluidic cartridge that is comprised of (i) a three-dimensional fluid channel in which a fluid is to be transported, said three-dimensional fluid channel being isolated from the pneumatic interface plate; and (ii) a flexible membrane that spans a plane, the flexible membrane being part of an outer surface of the microfluidic cartridge that isolates the three-dimensional fluid channel from the pneumatic interface plate, the three-dimensional fluid channel being defined in three dimensions by internal walls of the microfluidic cartridge and by the flexible membrane, wherein (a) the flexible membrane is in a ground state, when no pressure or vacuum is applied to the flexible membrane, and (b) the flexible membrane is pneumatically deflectable from the ground state perpendicular to the plane in two directions, when the microfluidic cartridge is placed onto the parallel pneumatic interface plate,
wherein the pneumatic interface plate comprises:
an instrument side facing the pneumatic instrument when the pneumatic interface plate is inserted into the pneumatic instrument,
a cartridge side facing the microfluidic cartridge when the microfluidic cartridge is placed onto the pneumatic interface plate,
a pneumatic channel connecting a pneumatic fluid of the pneumatic instrument from the instrument side to the cartridge side to enable pneumatic driving of the flexible membrane of the microfluidic cartridge, and
wherein the pneumatic interface plate and the microfluidic cartridge are detachably fixable to each other solely by pneumatic forces.

6. The pneumatic interface plate according to claim 5, wherein the cartridge side has at least one recess for sucking in the flexible membrane of the microfluidic cartridge when an under pressure is applied to the flexible membrane.

7. The pneumatic interface plate according to claim 5, further comprising at least one element selected from the group consisting of a heat generating device, a heat transfer element made out of aluminum, a heat transfer element made out of copper, a heat transfer element made out of an alloy of aluminum and/or copper, a heat generating device having heat transfer elements that extend to the microfluidic cartridge, an acoustic energy generating device, a device for treating the fluid with focused or unfocused ultrasound, a piezoelectric actuator, a mechanical actuator, a magnetic actuator, and any combinations thereof.

8. The pneumatic interface plate according to claim 5, wherein the pneumatic interface plate is made out of a material selected from the group consisting of steel, stainless steel, glass, elastomer, polymer, chemically resistant and moderately heat conductive material, and any combinations thereof.

9. A system for handling fluids comprising:
a pneumatic instrument;
a parallel pneumatic interface plate; and
a microfluidic cartridge detachably fixable to the parallel pneumatic interface plate solely by pneumatic forces, said microfluid cartridge comprising:
(i) a three-dimensional fluid channel in which a fluid is to be transported, said three-dimensional fluid channel being isolated from the parallel pneumatic interface plate; and
(ii) a flexible membrane that spans a plane, the flexible membrane being part of an outer surface of the microfluidic cartridge that isolates the three-dimensional fluid channel from the parallel pneumatic interface plate, wherein
the three dimensional fluid channel is defined by internal walls of the microfluidic cartridge and by the flexible membrane,
the flexible membrane is in a ground state, when no pressure or vacuum is applied to the flexible membrane, and
the flexible membrane is pneumatically deflectable from the ground state perpendicular to the plane in two directions, when the microfluidic cartridge is placed onto the parallel pneumatic interface plate;
the parallel pneumatic interface plate comprising:
(i) an instrument side facing the pneumatic instrument when the parallel pneumatic interface plate is inserted into the pneumatic instrument,
(ii) a cartridge side facing the microfluidic cartridge when the microfluidic cartridge is placed onto the parallel pneumatic interface plate, and
(iii) a pneumatic channel to connect a pneumatic fluid of the pneumatic instrument from the instrument side to the cartridge side to enable pneumatic driving of the flexible membrane of the microfluidic cartridge; and
wherein the flexible membrane of the microfluidic cartridge is deflectable by pneumatic pumping through the pneumatic channel of the parallel pneumatic interface plate in such a way that a fluid in the fluid channel is movable along the fluid channel.

10. The system according to claim 9, wherein the flexible membrane and the cartridge side of the parallel pneumatic interface plate are adapted so that, by applying under pressure through a pneumatic channel of the parallel pneumatic interface plate, the microfluidic cartridge is detachably fixed to the parallel pneumatic interface plate.

11. The system according to claim 9, further comprising control features arranged above and below the flexible membrane,
wherein the control features above the flexible membrane are arranged as obstacles for a fluid transport inside of the fluid channel, and
wherein the flexible membrane is mechanically supported by the control features so that the flexible membrane deflects during pneumatic pumping to allow the fluid to pass the obstacles.

12. The system according to claim 9, wherein the flexible membrane and pneumatic chambers of the parallel pneumatic interface plate are reversibly assembled, whereby a separation plane between the parallel pneumatic interface plate and the pneumatic cartridge crosses the pneumatic chambers.

13. A pneumatic instrument used in combination with a microfluidic cartridge and a pneumatic interface plate, wherein the pneumatic instrument generates pneumatic pumping to the microfluidic cartridge for fluid transportation inside the microfluidic cartridge, the pneumatic instrument comprising:

means for pneumatically actuating a flexible membrane of the microfluidic cartridge, wherein
(i) said pneumatic interface plate serves as an interface between the microfluidic cartridge and the pneumatic instrument, the pneumatic interface plate pneumatically fixing the microfluidic cartridge to the pneumatic interface plate and applying pneumatic pumping at the microfluidic cartridge, (ii) said microfluidic cartridge is comprised of:
(a) a three dimensional fluid channel in which a fluid is to be transported, said three dimensional fluid channel being isolated from the pneumatic interface plate; and
(b) a flexible membrane that spans continuously across a plane, the flexible membrane being part of an outer surface of the microfluidic cartridge that isolates the three-dimensional fluid channel from the pneumatic interface plate, the three dimensional fluid channel being defined in three dimensions by internal walls of the microfluidic cartridge and by the flexible membrane, wherein (1) the flexible membrane is in a ground state, when no pressure or vacuum is applied to the flexible membrane, (2) the flexible membrane is pneumatically deflectable from the ground state perpendicular to the plane in two directions, when the microfluidic cartridge is placed onto the parallel pneumatic interface plate, and (3) the microfluidic cartridge is detachably fixable to the pneumatic interface plate solely by pneumatic forces; and (iii) said pneumatic interface plate is comprised of
an instrument side facing the pneumatic instrument when the pneumatic interface plate is inserted into the pneumatic instrument,
a cartridge side facing the microfluidic cartridge, when the microfluidic cartridge is placed onto the pneumatic interface plate, and
a pneumatic channel connecting a pneumatic fluid of the pneumatic instrument from the instrument side to the cartridge side to enable pneumatic driving of the flexible membrane of the microfluidic cartridge.

* * * * *

UNITED STATES PATENT AND TRADEMARK OFFICE
CERTIFICATE OF CORRECTION

PATENT NO. : 9,044,752 B2
APPLICATION NO. : 13/503322
DATED : June 2, 2015
INVENTOR(S) : Wimberger-Friedl et al.

It is certified that error appears in the above-identified patent and that said Letters Patent is hereby corrected as shown below:

Title Page, Item (75) Inventors, lines 5-6, the inventor identified as "Johannes Theodorus Antonius Loring, AE Eindhoven (NL)", should read --Theodorus Antonius Johannes Loring, AE Eindhoven (NL)--.

Title Page, Item (75) Inventors, lines 6-7, the inventor identified as "Jochem Martijn Van Uden, AE Eindhoven (NL)", should read --Martijn Jochem Van Uden, AE Eindhoven (NL)--.

Signed and Sealed this
Fifth Day of January, 2016

Michelle K. Lee
*Director of the United States Patent and Trademark Office*